March 20, 1962 J. E. COTTLE ET AL 3,026,314
DISPOSAL OF SPENT FILTER CAKE
Filed Oct. 9, 1957
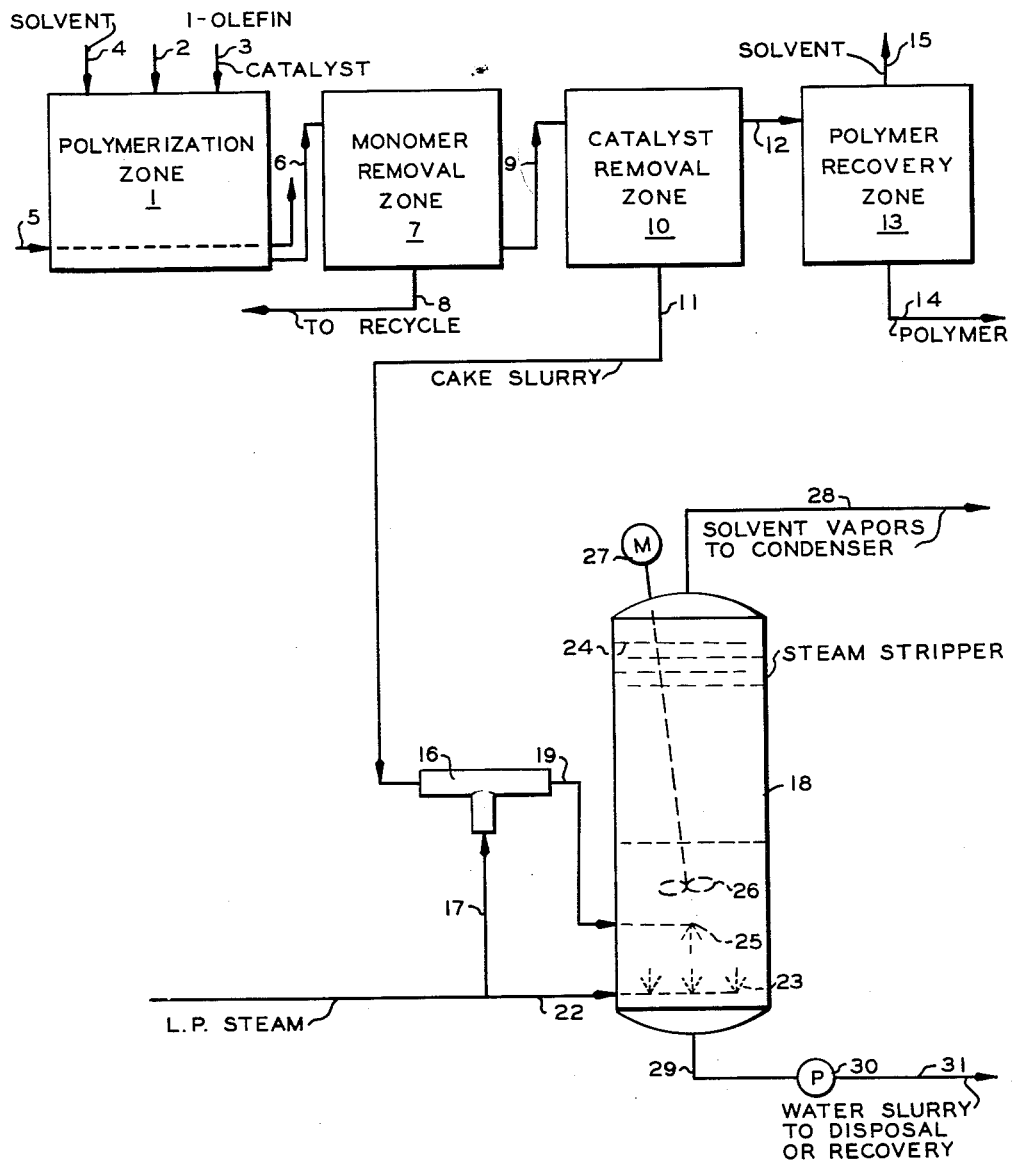
INVENTORS
J.E. COTTLE
R.G. WALLACE
BY *Hudson and Young*
ATTORNEYS

# 3,026,314
DISPOSAL OF SPENT FILTER CAKE
John E. Cottle, Bartlesville, Okla., and Robert G. Wallace, Houston, Tex., assignors to Phillips Petroleum Company, a corporation of Delaware
Filed Oct. 9, 1957, Ser. No. 689,164
5 Claims. (Cl. 260—94.9)

This invention relates to the polymerization of polymerizable hydrocarbons. In one aspect the invention relates to the recovery of solvent from a filter cake of solid catalyst containing solvent. In another aspect, it relates to an improved method for removing solvent from a slurry of solid catalyst in solvent resulting from removal of dissolved polymer and solvent from admixture with said solid catalyst. In still another aspect, the invention relates to a novel separation system for removal of solvent from a slurry of finely divided catalyst, with or without filter aid, in said solvent so as to recover a slurry of catalyst, with or without filter aid, in water.

Various methods are known for producing normally solid and semi-solid polymers. For example, hydrocarbons, such as ethylene, propylene, isobutene, butadiene and styrene, can be polymerized, either independently or in various admixtures with one another to produce solid or semi-solid polymers or copolymers. Recently, considerable attention has been directed to the production of solid olefin polymers, such as polymers of ethylene and/or propylene. The polymerizations are frequently carried out in the presence of a solid catalyst, utilizing a liquid solvent as the reaction medium. As a result, the polymers recovered from the reactions are often in the form of solutions in liquid solvents, which contain suspended particles of solid catalyst. It is usually, but not always, necessary to separate the catalyst from the reaction effluent, if a polymer product of acceptable ash content is to be produced.

One method which has been proposed for separating the solid catalyst from polymer solutions comprises passing the polymer solution through a batch-type precoat filter, such as a Vallez filter. When the pressure drop across the filter reaches a predetermined value, the supply of polymer solution to the filter is terminated. Thereafter, the filter is usually flushed with a suitable solvent, and a slurry containing filter aid, solid catalyst and polymer is recovered from the filter, the polymer being present in solution in the solvent and as a coating on the catalyst. The solvent is then removed from the slurry for reuse in the process and the filter aid and catalyst is either discarded or separated for reuse in the process.

The simplest process for recovering the solvent from the slurry is to flash and steam strip the filter cake slurry to produce a water slurry of polymer, catalyst and filter aid which is substantially free of solvent. This procedure, however, results in a stringy material which fouls agitators and pumps and renders the resulting aqueous slurry difficult to process.

In accordance with this invention, a method and means is provided whereby the solvent can be recovered from the slurry in a steam stripping operation so as to produce a slurry of discrete particles of the solids instead of stringy, low density solids in the resulting aqueous slurry.

It is therefore an object of this invention to provide a method for removing solvent from a slurry of catalyst particles in solvent so as to produce an aqueous slurry of discrete particles of the catalyst.

It is also an object of this invention to provide an improved method for removing solvent from a slurry of discrete solids in said solvent.

It is also an object of this invention to provide a novel device for removing solvent from a slurry of discrete solid particles in solvent so as to produce an aqueous slurry of discrete solids.

Other and further objects and advantages of the invention will become apparent to those skilled in the art upon consideration of the accompanying disclosure.

Broadly, the invention contemplates admixing a slurry of discrete particles in a solvent and a solution of polymer in the solvent with steam and passing the resulting dispersion to a steam stripper with substantially no flashing, evaporating the solvent with steam, and recovering an aqueous slurry of discrete particles.

In one embodiment of the invention, a slurry of catalyst and filter aid in a diluent or solvent is withdrawn from a filtration zone, admixed with low pressure steam in a mixing T, and passed to a steam stripping zone through a restricting pipe so as to allow a gradual decrease in pressure on the mixture prior to entry in the stripping zone. Additional low pressure steam is admitted to the steam stripping zone and the contents of the stripping zone are continuously agitated. Solvent vapors and some steam are recovered as the overhead product of the stripping zone and an aqueous slurry of discrete particles of catalyst, polymer, and filter aid is recovered from the stripping zone.

While the present invention is, in general, applicable to the recovery of solvent from any solid catalyst containing a minor amount of solid polymer, it is particularly applicable to the recovery of solvent from catalyst used in the process described in copending U.S. patent application of Hogan and Banks, Serial No. 573,877, filed March 26, 1956, now Patent No. 2,825,721. As set forth in this application, in more detail, unique polymers and copolymers can be produced by contacting one or more olefins with a catalyst comprising, as an essential ingredient, chromium oxide, preferably including a substantial amount of hexavalent chromium. The chromium oxide is ordinarily associated with at least one other oxide, particularly at least one oxide selected from the group consisting of silica, alumina, zirconia, and thoria.

One satisfactory method for producing the catalyst comprises the use of a steam-aged commercial cracking catalyst comprising a coprecipitated gel containing approximately 90 weight percent silica and 10 weight percent alumina. Such a gel is impregnated with an aqueous solution of a chromium compound ignitable to chromium oxide. Examples of such compounds are chromium trioxide, chromium nitrate, chromium acetate, and ammonium chromate. The composite resulting from the impregnation step is dried and then contacted for a period of several hours at a temperature of from about 450 to 1500° F., preferably from about 900 to about 1000° F., for example, with a stream of a substantially anhydrous-oxygen-containing gas, such as air. The olefin feed used for the polymerization is at least one olefin selected from the class of 1-olefins containing not more than eight carbon atoms per molecule and having no branching nearer the double bond than the four-position. Examples of such olefins include ethylene, propylene, 1-butene, 1-pentene, and the like. It is also within the scope of the invention to use diolefins, such as 1,3-butadiene, as the feed for the polymerization. Copolymers, such as ethylene-propylene copolymers and ethylene-butadiene copolymers, can be prepared by the described method. The polymerization can be effected at a temperature in the range of 150 to 450° F., with the pressure ranging from approximately atmospheric to as high as 1000 p.s.i.

A satisfactory method of conducting the polymerization comprises contacting an olefin with a slurry of catalyst in a hydrocarbon solvent which can exist as a liquid at the temperature of polymerization. In such a case, the reaction pressure need only be sufficient to maintain the solvent substantially in the liquid phase and will ordinarily range from about 100 to about 700 p.s.i. When the polymerization is carried out in this manner, the reaction effluent, which comprises a mixture of solvent and polymer, contains finely divided suspended catalyst. A method for separating catalyst from the reaction effluent is usually, but not always necessary if a polymer product of acceptable ash content is to be produced.

Suitable solvents for use in the above-described process are hydrocarbons which are liquid and chemically inert under the reaction conditions. Solvents which can be advantageously used include paraffins, such as those having from 3 to 12, preferably from 7 to 9, carbon atoms per molecule, for example, 2,2,4-trimethylpentane (isooctane), normal decane, normal hexane, isopentane, and the like. Another class of solvents which can be used are naphthenic hydrocarbons having from 5 to 6 carbon atoms in naphthenic ring and which can be maintained in the liquid phase under the polymerization conditions. Examples of such naphthenic hydrocarbons are cyclohexane, cyclopentane, methylcyclopentane, methylcyclohexane, ethylcyclohexane, the methyl ethyl cyclopentanes, the methyl propyl cyclohexanes, and the ethyl propyl cyclohexanes. The described class of naphthenic hydrocarbons includes condensed ring compounds such as decalin and the alkyl derivatives thereof. A preferred subclass of naphthenic hydrocarbons within the above-defined class is constituted by those naphthenic hydrocarbons having from 5 to 6 carbon atoms in a single ring and from 0 to 2 methyl groups as the only substituents on the ring. Thus, the preferred naphthenic hydrocarbon solvents are cyclopentane, cyclohexane, methylcyclopentane, methylcyclohexane, the dimethylcyclopentanes, and the dimethylcyclohexanes.

In order to more clearly describe the invention and to provide a better understanding thereof, reference is made to the accompanying drawing which is a diagrammatic illustration of a polymerization system including the means of this invention for the recovery of solvent from the filter cake separated from the solution of polymer in solvent. As a specific embodiment of the invention, the process of the drawing will be described as applied to the polymerization of ethylene in the presence of a chromium oxide catalyst and cyclohexane as the solvent or diluent. It is to be understood that other materials can be utilized in the practice of the invention. Various items of equipment are not illustrated in order to simplify the description of the invention. One skilled in the art will, however, recognize where pumps, valves, heat exchangers and other conventional items of equipment will be required in the process described.

Referring now to the drawing a feed stream consisting essentially of the polymerizable 1-olefin, ethylene in this instance, is passed to polymerization zone 1 via conduit 2. Catalyst, comprising chromium oxide, is introduced to said polymerization zone via conduit 3. The catalyst will usually be dispersed in at least a portion of the solvent. Any additional cyclohexane solvent is added to polymerization zone 1 via conduit 4. During polymerization, the material in the polymerization zone is maintained in a highly agitated state by means of a mechanical mixer or other conventional mixing means (not shown). The reaction is carried out at polymerization temperatures in the range of 230 to 300° F. and in this instance is preferably carried out at a temperature of about 285° F. and a pressure of 500 p.s.i. for a sufficient period of time to convert a portion of the ethylene feed to solid ethylene polymer (at atmospheric temperature). The polymerization reaction is exothermic so that it is necessary to remove heat from the polymerization zone. This can be accomplished by indirect heat exchange, for example, cooling water in conduit 5. The polymerization zone effluent, at about 280 to 285° F. from zone 1 passes via conduit 6 to monomer removal zone 7 wherein unreacted ethylene is vaporized and removed via conduit 8 to ethylene recycle. The mixture passes from monomer removal zone 7 via conduit 9 to catalyst removal zone 10 wherein the solution and catalyst are separated. Catalyst removal is effected by any suitable means, such as centrifugation, filtration and the like. In this specific instance, removal of the catalyst is effected by means of a precoat filter wherein a filter aid such as diatomaceous earth is employed. When the pressure drop across the filter reaches a predetermined value, such as about 30 p.s.i., the filter cake is flushed from the filter with additional solvent and a slurry containing filter aid, solid catalyst, and polymer is recovered from the filter zone via conduit 11. The solution of polymer in solvent is removed from catalyst removal zone 10 via conduit 12 and is passed to polymer recovery zone 13. Polymer is withdrawn via conduit 14 and solvent is withdrawn through conduit 15 for reuse in the process. The slurry in conduit 11 comprises solid catalyst and solid filter aid as a pumpable slurry in cyclohexane. Polymer is present in this slurry principally as a coating on the catalyst particles. The slurry is passed to mixing T 16 wherein it is intimately admixed with low pressure steam introduced via conduit 17 and passed to steam stripper 18 via conduit 19. Mixing device 16 is shown as a mixing T, however, other means for mixing the two streams can be employed, for example, mixing can advantageously be accomplished in a turbine so that a pressure drop from the mixing device to the steam stripper is substantially eliminated by causing the stream to do work in the turbine. In this specific instance wherein a mixing T is employed, the effluent from the mixing T traverses a restricting conduit illustrated as conduit 19. Additional low pressure steam is introduced into the steam stripper via conduit 22 and distributor means 23. The admixture of slurry and steam is introduced to steam stripper 18 at a point below the surface of the agitated slurry and this is accomplished by introducing the mixture via conduit 19 and spray means 25. The slurry in the steam stripper is maintained in a highly agitated state by means of mixer impeller 26 which is operated by motor 27. Solvent vapors are removed from steam stripper 18 via conduit 28 for reuse in the system. Baffles 24 prevent entrainment of solid particles in the vapors being withdrawn via conduit 28. An aqueous slurry of catalyst and filter aid is removed from steam stripper 18 via conduit 29 and is passed by means of pump 30 and conduit 31 to disposal or to a recovery step. The polymer which is present in the slurry is substantially removed as a coating on the catalyst particles and as small agglomerates of polymer.

The following description of actual runs will also provide a better understanding of the invention. In a polymerization process for producing solid polymer from ethylene in the presence of cyclohexane and a catalyst comprising a coprecipitated silica-alumina (90–10) base impregnated with chromium oxide containing an appreciable amount of hexavalent chromium and having an average particle size of about 20 microns with a maximum particle size of about 70 microns, the reactor effluent comprising cyclohexane, dissolved polymer, and solid catalyst was passed to a Vallez precoat filter having a precoat of celite filter aid on the filter surface. When the pressure drop across the filter reached about 30 p.s.i., the flow of reactor effluent to the filter was stopped and the filter cake was washed with cyclohexane to remove polymer solution. The filter cake was then sluiced from the filter surface with cyclohexane and flowed to a steam stripper as a slurry in cyclohexane. The temperature was maintained at filtering temperature (about 250° F. or higher). The stream of slurry was passed through a T to the stripper at about 30 p.s.i.g. and low pressure steam (less than 30 p.s.i.g.) was injected into the T, perpendicular to the flow of slurry in an amount of about 0.01 to 0.03 pound of steam per pound of slurry. The pipe from the T to the stripper was the same inside diameter as the slurry pipe to the T. The mixture of slurry and steam was introduced below the surface of agitated hot water (160–

180° F.) in the stripper. The contents of the stripper were then stripped with steam at a velocity of about five feet per second and substantially atmospheric pressure to recover solvent. About 1 lb. of polymer per 1 lb. of catalyst was removed from the stripper.

A similar run was made wherein the filter cake was drained of solvent but was not washed with cyclohexane so that the slurry to the stripper contained a greater quantity of polymer. No difficulty was encountered in any of the runs, there was no stringy stripped cake, and there was no fouling tendency. About 5 lb. of polymer per 1 lb. of catalyst were removed from the stripper.

The filter cake slurry is removed from the filter at about filtering temperature which in the case of ethylene polymerization is about 280 to 285° F. The temperature of the steam should not be above 300° F., therefore the steam pressure should be about 50 p.s.i.g. or less. The amount of steam introduced into the slurry should be in the range of 0.005 to 0.1 pound of steam per pound of slurry and it is preferable to use 0.01 to 0.03 pound per pound in order to satisfactorily break up the filter cake so as to avoid formation of stringy material.

Reasonable variations are possible within the scope of the disclosure of the present invention, the essence of which is a means and method for preventing fouling of equipment by formation of stringy polymer-containing catalyst filter cake by adding steam to a slurry of filter cake in solvent and introducing such mixture to steam stripping with substantially no flashing.

That which is claimed is:

1. A process for recovering organic solvent present in a filter cake comprising a solid catalyst and a minor amount of solid polymer which comprises admixing additional organic solvent with said filter cake to form a slurry; adding steam to said slurry so as to agitate said slurry to break up the filter cake into discrete particles; introducing said slurry into a body of water in a stripping zone; passing additional steam through said water to vaporize said organic solvent; removing said solvent as a vapor; and removing the solids as an aqueous slurry.

2. The process of claim 1 wherein the polymer is polyethylene and the solvent is cyclohexane.

3. In a process for polymerizing an olefin in the presence of a hydrocarbon diluent having 3 to 12 carbon atoms per molecule and in the presence of a solid catalyst to produce a solid polymer and wherein the solid catalyst is removed from a solution of the polymer produced dissolved in the diluent by a separation step wherein a minor portion of polymer is retained by the solid catalyst, the improvement comprising the steps of slurrying said separated catalyst in substantially polymer-free diluent; intimately admixing steam in the amount of about 0.01 to about 0.03 pound per pound of slurry with the slurry to separate the solid catalyst into discrete particles; introducing said slurry of discrete particles into a body of hot water contained in a stripping zone with a minimum of pressure drop; heating said body of water to a temperature between the boiling point of water and about 300° F. to steam strip diluent from said stripping zone; recovering diluent from said stripping zone as a vapor; and removing the discrete particles as an aqueous slurry.

4. The process of claim 3 wherein the separation step is a filtering step.

5. In the process of polymerizing ethylene to solid polyethylene in the presence of a diluent and in the presence of a solid catalyst comprising chromium oxide wherein the catalyst is removed from a solution of polyethylene in diluent in a filtering step utilizing a filter aid and the filter cake is steam stripped in a stripping step to recover diluent, the improvement comprising slurrying the filter cake from the filtering step in diluent; adding steam to said slurry at a pressure less than 50 p.s.i.g. and in an amount in the range of about 0.005 to 0.1 pound of steam per pound of slurry to agitate said slurry and to separate the filter cake into discrete particles prior to said steam stripping step; and introducing the steam-containing slurry to said stripping step with a minimum of pressure drop.

References Cited in the file of this patent

UNITED STATES PATENTS

| | | |
|---|---|---|
| 2,360,787 | Musphree et al. | Oct. 17, 1944 |
| 2,384,967 | Schumacher et al. | Sept. 18, 1945 |
| 2,530,144 | Bannon | Nov. 14, 1950 |
| 2,620,313 | Odell | Dec. 2, 1952 |
| 2,702,288 | Hoeksema et al. | Feb. 15, 1955 |
| 2,766,224 | Bannon | Oct. 9, 1956 |
| 2,825,721 | Hogan et al. | Mar. 4, 1958 |
| 2,849,429 | Cines | Aug. 26, 1958 |